United States Patent
Schoenmeyr

[11] Patent Number: 5,503,736
[45] Date of Patent: Apr. 2, 1996

[54] HYDROBOOST PISTON PUMP FOR REVERSE OSMOSIS SYSTEM

[75] Inventor: Ivar Schoenmeyr, Mission Viejo, Calif.

[73] Assignee: Aquatec Water Systems, Inc., Anaheim, Calif.

[21] Appl. No.: 234,057

[22] Filed: Apr. 28, 1994

[51] Int. Cl.⁶ .................................................. B01D 61/10
[52] U.S. Cl. ..................... 210/91; 210/416.1; 210/416.3; 417/63; 417/262; 417/403
[58] Field of Search .................. 210/91, 416.1, 210/416.3; 417/63, 259, 260, 262, 443, 505, 545, 391, 403, 404

[56] References Cited

U.S. PATENT DOCUMENTS

| | | | |
|---|---|---|---|
| 4,187,173 | 2/1980 | Keefer | 210/416.1 |
| 4,434,056 | 2/1984 | Keefer | 210/416.1 |
| 4,523,895 | 6/1985 | Silva | 417/225 |
| 4,610,605 | 9/1986 | Hartley | 417/269 |
| 4,627,794 | 12/1986 | Silva | 417/225 |
| 4,836,924 | 6/1989 | Solomon | 210/321.87 |
| 5,000,845 | 3/1991 | Solomon | 210/134 |
| 5,009,777 | 4/1991 | Solomon | 210/416.1 |
| 5,154,820 | 10/1992 | Solomon | 210/416.1 |
| 5,203,803 | 4/1993 | Schoenmeyr | 210/416.3 |
| 5,380,428 | 1/1995 | Solomon | 210/416.1 |

OTHER PUBLICATIONS

*Communications Architecture for Multiprocessor Networks*, Nowatzyk, G, Ph.D. dissertation, Carnegie Mellon University, 1989. (see chapter 3).

*Primary Examiner*—Joseph W. Drodge
*Attorney, Agent, or Firm*—Blakely, Sokoloff, Taylor & Zafman

[57] ABSTRACT

A booster pump for a reverse osmosis water purification system. The booster pump has a spring return piston that is stroked by the pressure of feedwater. The pump also has a pair of solenoid control valves that control the flow of feedwater into and out of the pump to move the piston between stroke and return positions. The control valves are switched by a detector switch which detects when the piston reaches the fully stroked and return positions.

8 Claims, 2 Drawing Sheets

HYDROBOOST PISTON PUMP FOR REVERSE OSMOSIS SYSTEM

BACKGROUND OF THE INVENTION

1. Field of the Invention

The present invention relates to a booster pump for a reverse osmosis water purification system.

2. Description of Related Art

Reverse osmosis (RO) water purification systems contain an osmotic membrane that removes impurities from a source of feedwater. RO systems require a relatively high water pressure to push the feedwater through the osmotic membrane. For this reason, RO systems typically include a pump to increase the feedwater pressure. Conventional RO pumps are driven by an electric motor which receives power from a dedicated power source or a municipal power outlet. Consequently, electric driven pumps require access to some type of electrical power. Additionally, electric driven pumps are relatively expensive to produce and repair. The consumption of electric power also increases the cost of operating the RO system.

U.S. Pat. Nos. 4,836,924 and 5,000,845 issued to Solomon, disclose a mechanical booster pump for a reverse osmosis water purification system. The Solomon booster pump contains a spring return piston that is driven by the pressure of the feedwater. The piston has a first head located within an inlet/reversing chamber of the pump and a second head that is located within a pump outlet chamber. The area ratios of the piston heads is such that the introduction of feedwater to the inlet chamber will stroke the piston and pressurize feedwater within the outlet chamber.

The Solomon pump also contains a spring actuated control valve that opens when the piston reaches a predetermined stroke position. Feedwater flows into the reversing chamber when the control valve is opened. The force of the piston return spring and the pressure of the feedwater within the reversing chamber push the piston back to the return position, wherein the valve closes and the cycle is repeated.

The spring needed to open the control valve of the Solomon pump requires additional energy to close the valve. The additional energy required to close the control valve lowers the pressure boost ratio of the pump. The control valve is also subject to wear, resulting in an improper seating of the valve. Improper valve seating may reduce the pressure ratio of the pump. It has also been found that the Solomon pump requires an accumulator to minimize the pressure fluctuations between strokes. It would be desirable to have a booster pump which did not have all of the above listed disadvantages.

SUMMARY OF THE INVENTION

The present invention is a booster pump used in a reverse osmosis water purification system. The pump has an inlet port coupled to a source of feedwater, an outlet port and a first feed port connected to a water filter and a second feed port connected to a drain. The fluid flow through the feed ports is controlled by first and second solenoid valves, respectively. Located within the housing is a spring return piston which has a first head that separates a stroke chamber from a return chamber. The piston also has a second head which moves within a pressure chamber that is in fluid communication with the outlet port of the pump. The stroke chamber receives feedwater from the inlet port. The area ratio of the heads is such that the force of the feedwater on the first head is greater than the force on the second head, so that the piston is stroked and the feedwater within the pressure chamber is pressurized. During the stroke cycle the first valve is closed and the second valve is open so that feedwater within the return chamber can be drained.

The housing and piston have position detector switches that detect when the piston has reached the stroked and return positions. When the piston reaches the full stroke position, the detector switch closes the second valve and opens the first valve so that feedwater flows from the water filter into the return chamber. The force of the return spring and the pressure of the feedwater within the return chamber push the piston back to the original return position. When the piston reaches the fully return position, the detector switch again opens the second valve and closes the first valve so that the cycle is repeated. The flow of feedwater from the water filter also causes a flushing of the membrane within the filter.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
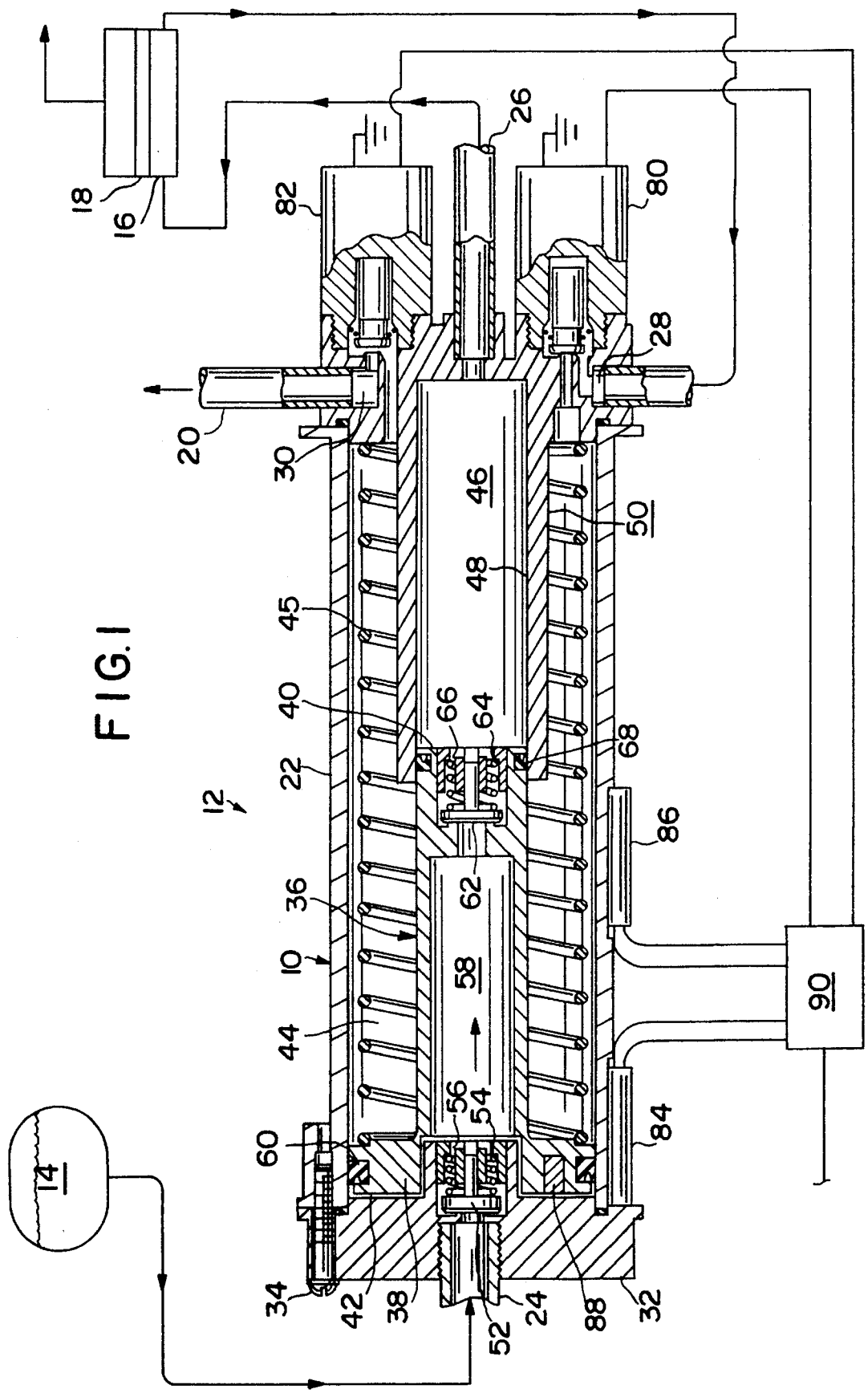
FIG. 1 is a schematic of a booster pump within a reverse osmosis purification system, showing a pump piston in a return position.

Referring to the drawings more particularly by reference numbers, FIG. 1 shows a booster pump 10 within a reverse osmosis purification system 12. The system includes a source of feedwater 14 and a water filter 16. The water filter 16 preferably contains an osmotic membrane 18 which removes impurities from feedwater that is pumped from the water source 14 by the pump 10. The pump 10 is also connected to a drain line 20. Although an osmotic membrane and reverse osmosis water purification system are shown and described, it is be understood that the booster pump 10 of the present invention can be used in other applications.

The pump 10 includes a housing 22 which has an inlet port 24, an outlet port 26, a first feed port 28 and a second feed port 30. The inlet port 24 is connected to the source of feedwater 14. The outlet port 26 and first feed port 28 are connected to the water filter 16. The second feed port 30 is connected to the drain line 20. The inlet port 24 is located within an end plate 32 that is fastened to the housing body 22 by screws 34.

Within the housing 22 is a piston 36 which has a first head 38 and a second head 40. The first head 38 separates a stroke chamber 42 from a return chamber 44. Located within the return chamber 44 is a return spring 45 that biases the piston 36 into the return position shown in FIG. 1. The second head 40 is located within a pressure chamber 46. The pressure chamber 46 is defined by the wall 48 of an orifice plate 50 that is attached to the end of the housing body 22.

The end plate 32 contains a first intake valve 52 that is biased into a closed position by spring 54. When the valve 52 is open, the inlet port 24 is in fluid communication with the stroke chamber 42 through passages 56 and piston chamber 58. The first head 38 has a seal 60 to seal the return chamber 44 from the stroke chamber 42.

The second piston head 40 contains a second intake valve 62 that is biased into a closed position by spring 64. When the valve is open, the pressure chamber 46 is in fluid communication with piston chamber 58 through passages 66. The second head 40 is sealed to the wall 48 by seal 68.

The pump 10 contains a first solenoid control valve 80 and a second solenoid control valve 82. The first valve 80 controls the flow of feedwater through the first feed port 28 and into the return chamber 44. The second valve 82 controls the flow of feedwater out of the return chamber 44 and through the second feed port 30.

The pump 10 also contains a piston detection switching system that detects the position of the piston and switches the valves between open and closed positions. In the preferred embodiment, the switching system includes a first transducer 84 and a second transducer 86 both attached to the housing body 22. The transducers are coupled to a detection element 88 located within the first head 38. The transducers may be Hall effect devices, capacitance proximity sensors or any other position detection means. Alternatively, the pump 10 may employ other position detection devices such as reed-switches.

The transducers are connected to a control circuit 90. The control circuit is coupled to the solenoids of the first valve 80 and a second valve 82. When the detection element 88 is adjacent to the first transducer 84, the transducer 84 provides a signal to the control circuit 90. In response to the first transducer signal, the control circuit 90 switches the first valve 80 off and the second valve 82 on, so that feedwater within the return chamber 44 can flow into the drain line. When the detection element 88 is adjacent to the second transducer 86, the transducer provides a signal to the control circuit 90 which switches the second valve 82 off and turns the first valve 80 on, so that feedwater flows into the return chamber 44. The control circuit 90 may contain a latch that sets and resets each time a signal is received from the transducers, so that the valves remain in an on/off state until the detection element moves to the other transducer.

In operation, the piston 36 is at the return portion shown in FIG. 1 and the pressure chamber 46 contains feedwater. Feedwater flows from the water source 14 into the stroke chamber 42 through the inlet port 24. The area of the piston head 38 is larger than the area of the pressure chamber 46 so that the force of the stroke chamber feedwater pressure on the piston head 38 is greater than the counteractive force of the pressure chamber water pressure on the piston 40. The larger first head pressure moves the piston 36 from the return position shown in FIG. 1 toward the stroke position shown in FIG. 2. The first valve 80 is off and the second valve 82 is on, so that the water within the return chamber 44 can flow into the drain line 20.

Figure 2:
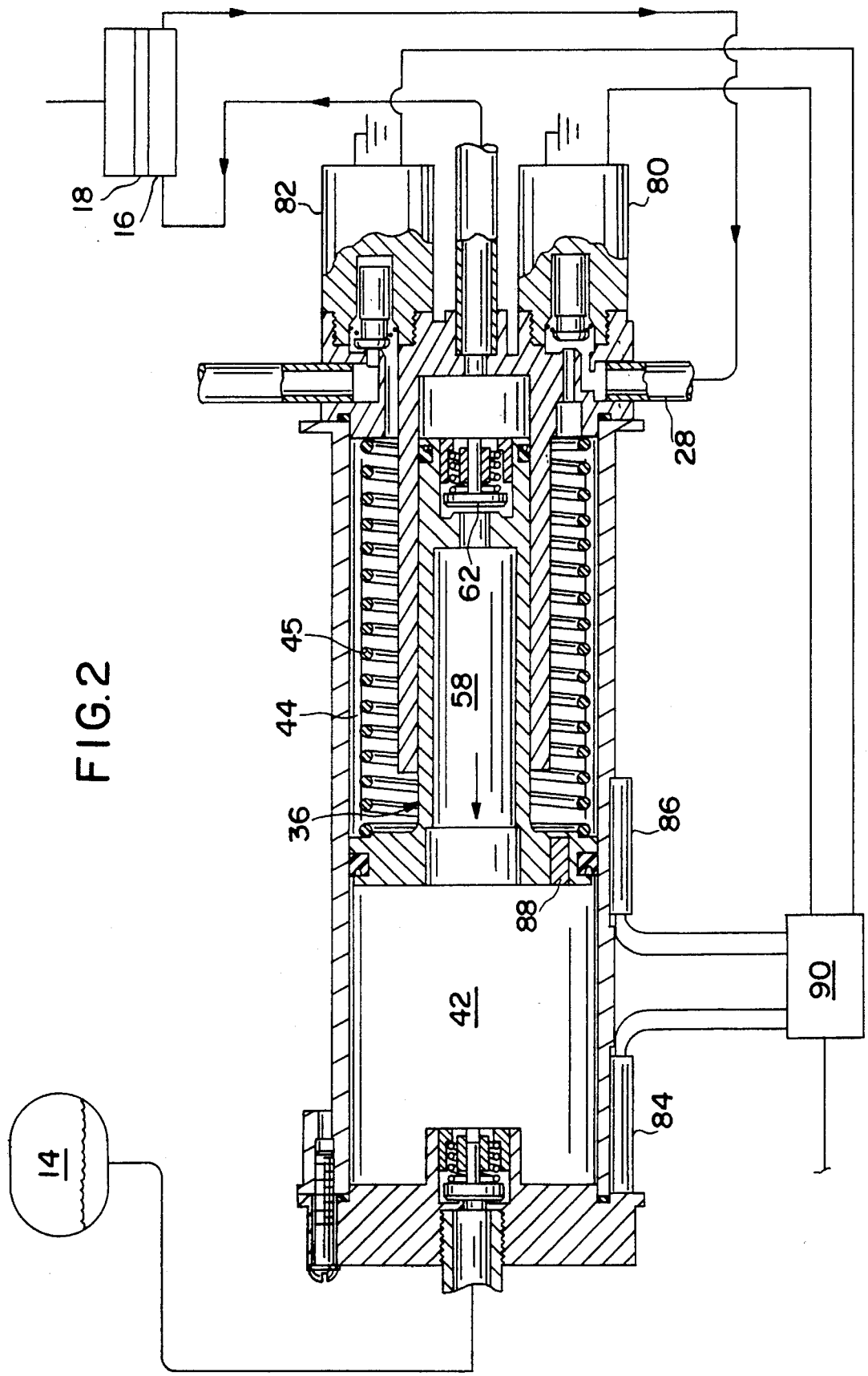
FIG. 2 is a schematic of the pump of FIG. 1, showing the piston in a stroked position.

As shown in FIG. 2, when the piston 36 reaches the stroke position, the detection element 88 is adjacent to the second transducer 86. The second transducer 86 provides an input signal to the control circuit 90, which switches the first valve 80 on and the second valve 82 off. The feedwater flows from the water filter 16 into the return chamber 44 through the first feed port 28. The force of the return spring 45 and the pressure of the feedwater within the return chamber 44, overcome the pressure of the feedwater within stroke chamber 42 and move the piston 36 back to the return position. The movement of the piston 36 reduces the volume of the stroke chamber 42 and increases the pressure of the water within the chamber 42. The pressurized water within the piston chamber 58 opens the intake valve 62 and allows the feedwater within the stroke chamber 42 to flow into the pressure chamber 46. When the piston 36 reaches the return position, the first transducer 84 provides an input signal to the control board which switches the first valve 80 off and the second valve 82 on, wherein the cycle is repeated.

The flow of feedwater into the return chamber 44 from the water filter 16 causes a flushing of the osmotic membrane 18 which removes impurities from the membrane 18. The present invention thus provides a device that not only increases the pressure of the feedwater, but also induces a continuous self-flushing of the osmotic membrane 18.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A booster pump for feedwater of a reverse osmosis water purification system, that has a source of feedwater at a source pressure and a drain at a drain pressure comprising:

a housing having an inlet port in fluid communication with a stroke chamber, an outlet port in fluid communication with a pressure chamber, a first feed port and a second feed port in fluid communication with a return chamber and the drain;

a first solenoid valve coupled to said first feed port, said first valve allows feedwater to flow from the source of feedwater into said return chamber when in an open position;

a second solenoid valve coupled to said second feed port, said second valve allows feedwater to flow from said return chamber into the drain when in an open position;

a piston within said housing, said piston having a first head adjacent to said stroke chamber, and a second head adjacent to said pressure chamber, said second head being smaller than said first head such that said piston moves between a return position and a stroke position to pressurize feedwater within said pressure chamber when feedwater flows into said stroke chamber;

a position switch operable to sense a position of said piston, and open said first solenoid valve and close said second solenoid valve when said primary piston reaches said stroke position so that said return chamber attains the source pressure and said piston moves to said return position, and open said second solenoid valve and close said first solenoid valve when said primary piston reaches said return position so that said return chamber attains the drain pressure and said piston moves to said stroke position;

return means for moving said piston from said stroke position to said return position when said first valve is opened.

2. The booster pump as recited in claim 1, wherein said position switch includes a first transducer and a second transducer attached to said housing and a detection element attached to said piston, such that said second valve is opened when said detection element is coupled to said first transducer and said first valve is opened when said detection element is coupled to said second transducer.

3. The booster pump as recited in claim 1, wherein said return means includes a primary spring coupled to said piston.

4. The booster pump as recited in claim 1, further comprising a pair of spring biased intake valves that control the flow of feedwater into said stroke and pressure chambers.

5. The reverse osmosis water purification system, comprising:

a source of feedwater at a source pressure;

a filter;

a drain at a drain pressure;

a booster pump that includes;

a housing having an inlet port coupled to said source of feedwater and is in fluid communication with a stroke chamber, an outlet port in fluid communication with a pressure chamber and said filter, a first feed port in fluid communication with a return chamber and said filter, and a second feed port in fluid communication with said return chamber and said drain;

a first solenoid valve coupled to said first feed port, said first valve allows feedwater to flow into said return chamber when in an open position;

a piston within said housing, said piston having a first head adjacent to said stroke chamber, and a second head adjacent to said pressure chamber, said second head being smaller than said first head such that said piston moves between a return position and a stroke position to pressurize feedwater within said pressure chamber when feedwater flows into said stroke chamber;

a second solenoid valve coupled to said second feed port, said second valve allows feedwater to flow from said return chamber when in an open position;

a position switch operable to sense a position of said piston, and open said first solenoid valve and close said second solenoid valve when said piston reaches said stroke position so that said return chamber attains the source pressure and said piston moves to said return position, and open said second solenoid valve and close said first solenoid valve when said piston reaches said return position so that said return chamber attains the drain pressure and said piston moves to said stroke position;

return means for moving said piston from said stroke position to said return position when said first valve is opened.

6. The system as recited in claim 5, wherein said position switch includes a first transducer and a second transducer attached to said housing and a detection element attached to said piston, such that said second valve is opened when said detection element is coupled to said first transducer and said first valve is opened when said detection element is coupled to said second transducer.

7. The system as recited in claim 5, wherein said return means includes a primary spring coupled to said piston.

8. The system as recited in claim 5, further comprising a pair of spring biased intake valves that control the flow of feedwater into said stroke and pressure chambers.

\* \* \* \* \*